United States Patent [19]
Lombardi

[11] 3,731,629
[45] May 8, 1973

[54] TEMPERATURE DISCRIMINATING DUAL IGNITER ROCKET IGNITION SYSTEM

[75] Inventor: Charles A. Lombardi, Rockaway, N.J.

[73] Assignee: The United States of America as represented by the Secretary of the Army, Washington, D.C.

[22] Filed: Jan. 27, 1971

[21] Appl. No.: 110,286

[52] U.S. Cl..................................102/49.7, 60/256
[51] Int. Cl............................................F42c 19/12
[58] Field of Search....................102/49.7, 70.2 A; 60/256

[56] References Cited

UNITED STATES PATENTS

| 2,685,837 | 8/1954 | Sage et al. | 102/70.2 A |
| 3,287,912 | 11/1966 | Wehlow et al. | 60/256 |

Primary Examiner—Verlin R. Pendegrass
Attorney—Joseph P. Nigon

[57] ABSTRACT

An igniter system for solid propellant type rockets and is designed to ignite the propellant over a wide range of temperature conditions. The system consists of a pair of igniters in circuitry with a power source. A thermostatic switch in the firing circuit acts upon a low temperature condition to permit firing of both igniters and upon high temperature, only one igniter.

2 Claims, 3 Drawing Figures

PATENTED MAY 8 1973
3,731,629
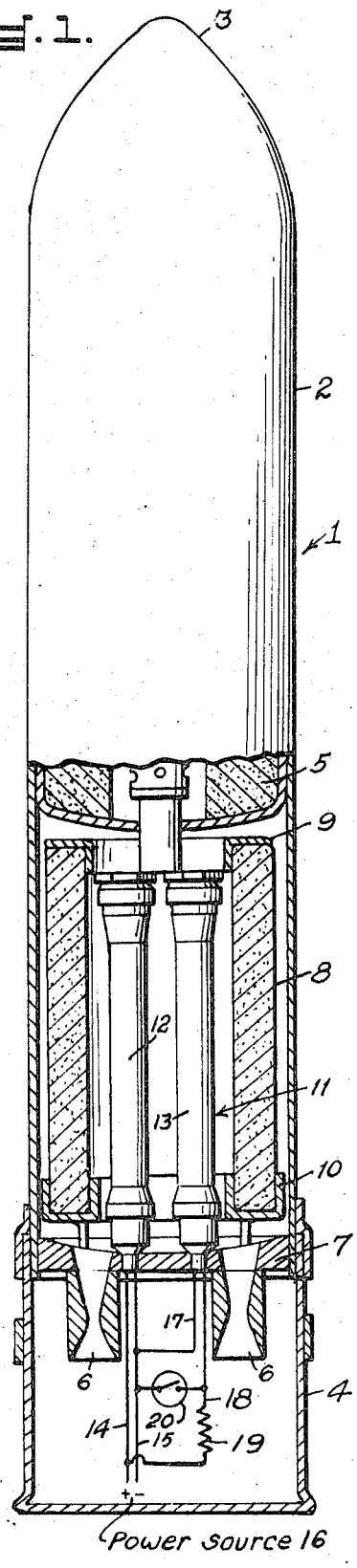
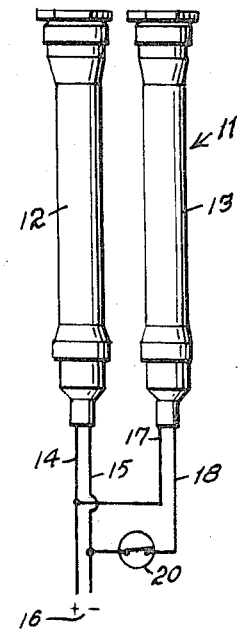
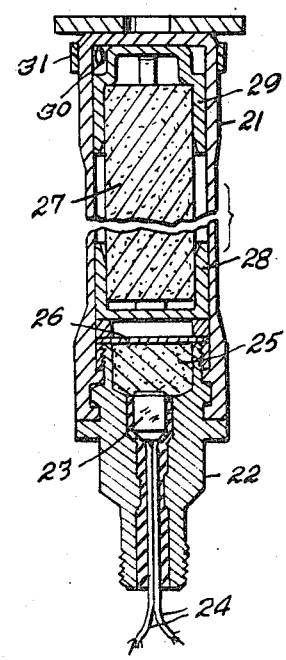
INVENTOR,
Charles A. Lombardi
BY: Harry M. Saragovitz,
Edward J. Kelly &
Herbert Berl ATTORNEYS.

TEMPERATURE DISCRIMINATING DUAL IGNITER ROCKET IGNITION SYSTEM

The invention described herein may be manufactured, used, and licensed by or for the Government for governmental purposes without the payment to me of any royalty thereon.

This invention relates to a temperature discriminating dual igniter rocket system and more particularly to a means of igniting a solid rocket propellant over a wide range of temperature conditions.

Solid propellant rocket motors are easiest to ignite at elevated temperatures and hardest to ignite at low temperatures, the output of the igniter being greater at elevated temperatures and less at lower temperatures. As a result, when sufficient ignition output is provided to satisfactorily ignite a rocket motor at a low temperature the same system is overpowered at elevated temperature, resulting in high pressure peaks and the like. The balance of ignition is therefore hard to achieve since success of the system depends upon uniform ignition characteristics over a very wide range of temperature, as for instance, $-40°$ to $+145°$ F. This was principally due to the fact that the rocket systems had but one fixed charge which was expected to ignite the rocket motor under all temperature conditions.

The present invention is designed to overcome the aforesaid problems in solid propellant ignition by using an incremental igniter, part of which is suitable for high temperature operation while another part, which is initiated at the discretion of a temperature sensing device, when added to the first, makes up a total output that is suitable for low temperature operation.

It is therefore a principal object of this invention to provide a means for the ignition of a solid propellant rocket motor whereby a uniform ignition output is achieved over a wide range of temperature conditions.

Another object is to provide a two-part igniter, one part suitable to ignite the propellant at high temperature and the other part, when added to the first part, the system is capable of igniting the propellant at low temperatures.

A still further object is to provide a temperature sensing means in the firing circuit of a two-part ignition system for a solid propellant rocket motor whereby one or both parts may be fired as the temperature conditions require.

These and other objects and advantages of the present invention will be fully apparent from the following description when taken in connection with the annexed drawing, in which:

FIG. 1 is an elevational view, partly in section, illustrating a solid propellant missile and showing a dual ignition firing system constructed in accordance with this invention;

FIG. 2 is an elevational view of a twin ignition system having a modified firing circuit, and, FIG. 3 is an axial section of one of the igniters.

With reference in detail to the drawing in which like reference numerals indicate like parts throughout the several views, reference character 1 designates generally, a solid propellant type missile adapted to be fired from a launching tube, not shown. Missile 1 includes a case 2 having an ogive portion 3 and a cap 4 at its breech end. A payload charge is indicated by 5. Other components include blast nozzles 6 supported by an aft bulkhead 7. Missile 1 is shown by way of example only since other types of missiles could be used with this invention as is expedient.

A rocket motor is shown in the breech portion of missile 1 and consists of a solid grain propellant 8 supported in case 2 by retaining elements 9 and 10.

The ignition system of this invention, FIG. 1, is indicated generally by 11 and consists of twin igniters 12 and 13 which are supported by suitable means, not shown, in propellant grain 8, as shown in FIG. 1 only.

A firing circuit for firing the igniters 12 and 13 is shown in FIG. 1 and consists of leads 14 and 15 connected to a power source 16 and to igniter 12. Leads 17 and 18 connect leads 14 and 15 with igniter 13, there being shown a resistor 19 in lead 18. A temperature sensing device 20, which may be a thermostatic switch, bridges lead 15 and 18.

The operation of the ignition system shown in FIG. 1 is as follows:

When the missile system is in the low temperature region, thermostatic switch is open and both igniters 12 and 13 will be fired through leads 14, 18, 15 and 17 from power source 16.

When the temperature of the system is sufficiently high so that both igniters, when fired, would produce too great an output, then thermostatic switch 20 would close, thus attenuating the electrical energy directed to igniter 13 and permitting only igniter 12 to fire which would be sufficient to ignite the rocket motor's solid propellant grain 8. This arrangement of the firing circuit insures automatic functioning of the system.

An alternative firing system is shown in FIG. 2. In this system igniter 12 is arranged to "always function," it being connected directly to leads 14 and 15 and power source 16. Igniter 13 is connected to leads 14 and 15 through leads 17 and 18. Thermostatic switch 20 is positioned in lead 18 and is normally closed at low temperature, but will open at a critical temperature, remaining open at high temperature. When the missile temperature is below the critical point, thermostatic switch 20 is closed, allowing the current in the firing circuit to flow to both igniters 12 and 13. At temperatures above the critical point, thermostatic switch 20 is open, blocking current from passing to igniter 13, thus permitting only igniter 12 to fire.

In FIG. 3 there is illustrated one of the igniters, which are identical in construction. Each igniter comprises a container fixed to a head assembly 22. A firing squib 23 connected to firing leads 24 is carried by the head assembly. A primer charge 25 is retained in head assembly 22 by a disc 26. A main charge 27 is disposed in container 21 and held therein by supports 28 and 29. Gas relief holes 30 are closed by a plastic wrap 31 so that when only one igniter is to be fired, hot combustion gases from the fired igniter cannot enter the igniter not being used to prevent its firing also and prevent its cook off.

Operation of missile 1, shown in FIG. 1, is as follows: The missile 1 is placed in a launching tube, not shown. When one, or both igniters 12 and 13 are fired, propellant grain 8 is ignited. Pressure from combustion builds up in cap 4 which then will cause cap 4 to become separated from missile 1 to expose blast nozzles 6 for the propulsion of the missile 1.

The firing systems of this invention can be controlled manually or automatically as is desired.

It is apparent from the foregoing that a highly efficient means for igniting a solid propellant rocket charge has been achieved by the present invention.

What is claimed is:

1. In combination with a missile:
a propellant motor comprising
   a. a casing
   b. a hollow propellant grain in said casing;
   c. a plurality of elongated igniters laterally spaced from each other and housed completely within the interior space of said propellant grain in parallel relation to the longitudinal axis of said propellant grain;
      each of said igniters having a casing, an igniting charge within said casing, a pair of electrical leads, and means for preventing non-electrical ignition of said igniting charge;
   d. a firing circuit for electrically igniting one of said igniters; and
   e. at least one supplemental firing circuit for electrically igniting at least one other of said igniters, said supplemental firing circuit being operable only below a predetermined ambient temperature;
      whereby said propellant grain may be ignited by said first-named igniter when the ambient temperature is not less than said predetermined temperature, and by a plurality of said igniters when the ambient temperature is below said predetermined temperature.

2. In combination with a missile
a propellant motor comprising
   a. a casing;
   b. a solid hollow propellant grain in said casing;
   c. a pair of elongated igniters laterally spaced from each other and housed completely within the interior space of said propellant grain in parallel relation to the longitudinal axis of said propellant grain;
      each of said igniters having a casing, an igniting charge within said casing, a pair of electrical lead, and means for preventing non-electrical ignition of said igniting charge;
   d. a firing circuit for electrically igniting one of said igniters; and
   e. a supplemental firing circuit for electrically igniting the other igniter, said supplemental firing circuit being operable only below a predetermined ambient temperature;
      whereby said propellant grain may be ignited by said first-named igniter when the ambient temperature is not less than said predetermined temperature, and by both igniters when the ambient temperature is below said predetermined temperature.

* * * * *